United States Patent
Fukano et al.

(10) Patent No.: US 6,892,749 B2
(45) Date of Patent: May 17, 2005

(54) MANIFOLD FOR SOLENOID-OPERATED VALVE

(75) Inventors: Yoshihiro Fukano, Moriya (JP); Masami Yoshida, Ryugasaki (JP); Noriya Sasaki, Kasukabe (JP)

(73) Assignee: SMC Kabushiki Kaisha, Tokyo (JP)

( * ) Notice: Subject to any disclaimer, the term of this patent is extended or adjusted under 35 U.S.C. 154(b) by 142 days.

(21) Appl. No.: 10/304,763

(22) Filed: Nov. 27, 2002

(65) Prior Publication Data

US 2003/0102040 A1 Jun. 5, 2003

(30) Foreign Application Priority Data

Dec. 4, 2001 (JP) ........................................ 2001-369720

(51) Int. Cl.[7] ............................................. F16K 11/10
(52) U.S. Cl. ....................................... 137/269; 137/884
(58) Field of Search ................................ 137/269, 271, 137/884; 251/367

(56) References Cited

U.S. PATENT DOCUMENTS

| | | | |
|---|---|---|---|
| 5,181,692 A | 1/1993 | Brausfeld | |
| 5,222,524 A | * 6/1993 | Sekler et al. | 137/884 |
| 5,333,647 A | 8/1994 | Fukano et al. | |
| 5,699,834 A | * 12/1997 | Hayashi et al. | 137/884 |

FOREIGN PATENT DOCUMENTS

EP      1 094 261      4/2001

OTHER PUBLICATIONS

Copending U.S. Appl. No. 10/409,176 filed Apr. 9, 2003 by Yoshihiro Fukano et al.

* cited by examiner

*Primary Examiner*—John Fox
(74) *Attorney, Agent, or Firm*—Paul A. Guss (57) ABSTRACT

A manifold connected to a solenoid-operated valve which has a connector having a plurality of fluid passages for supplying and discharging a fluid under pressure to and from the solenoid-operated valve, includes a body having a substantially rectangular shape, an engaging groove defined in an upper surface of the body, a mount hole defined in the body, and a stopper member. The stopper member is inserted in the mount hole, and has an end retained in the mount hole. The stopper member has an extensible resilient spring arm and an engaging hole defined in the stopper member for receiving and engaging the connector of the solenoid-operated valve when the stopper member is displaced.

10 Claims, 7 Drawing Sheets

FIG. 7

MANIFOLD FOR SOLENOID-OPERATED VALVE

BACKGROUND OF THE INVENTION

1. Field of the Invention

The present invention relates to a solenoid-operated valve manifold that can easily be connected to a solenoid-operated valve without the need for any mounting screws or the like.

2. Description of the Related Art

There has heretofore been known a solenoid-operated valve manifold having fluid passages and fluid ports that communicate with a plurality of ports of a solenoid-operated valve. The solenoid-operated valve manifold is connected to the solenoid-operated valve by mounting screws or the like. A fluid under pressure is introduced from the solenoid-operated valve manifold through one of the fluid passages into the solenoid-operated valve and discharged from the solenoid-operated valve through another of the fluid passages into the solenoid-operated valve manifold.

As described above, the solenoid-operated valve manifold is connected to the solenoid-operated valve by mounting screws or the like. However, if the solenoid-operated valve is to be designed in a smaller size, difficulty arises in providing the solenoid-operated valve with an enough space reserved therein for installing the mounting screws. Stated otherwise, use of mounting screws to connect the solenoid-operated valve to the manifold presents an obstacle to reduce the size of the solenoid-operated valve.

Another problem with the conventional solenoid-operated valve manifold is that it is tedious and time-consuming to fasten the manifold and the solenoid-operated valve to each other by the mounting screws. Furthermore, mounting screws for use on relatively small solenoid-operated valves are also relatively small in size, and hence cannot easily be tightened and loosened.

SUMMARY OF THE INVENTION

It is therefore a general object of the present invention to provide a solenoid-operated valve manifold which is capable of being easily connected to a solenoid-operated valve without any mounting screws or the like.

According to the present invention, when an engaging mechanism of a manifold is displaced in one direction, the engaging member engages a port member of a solenoid-operated valve to connect the manifold to the port member. When the engaging mechanism is displaced in the opposite direction, the engaging mechanism is brought out of engagement with the port member, removing the port member from the manifold. Therefore, the manifold and the solenoid-operated valve can easily be connected to and disconnected from each other.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
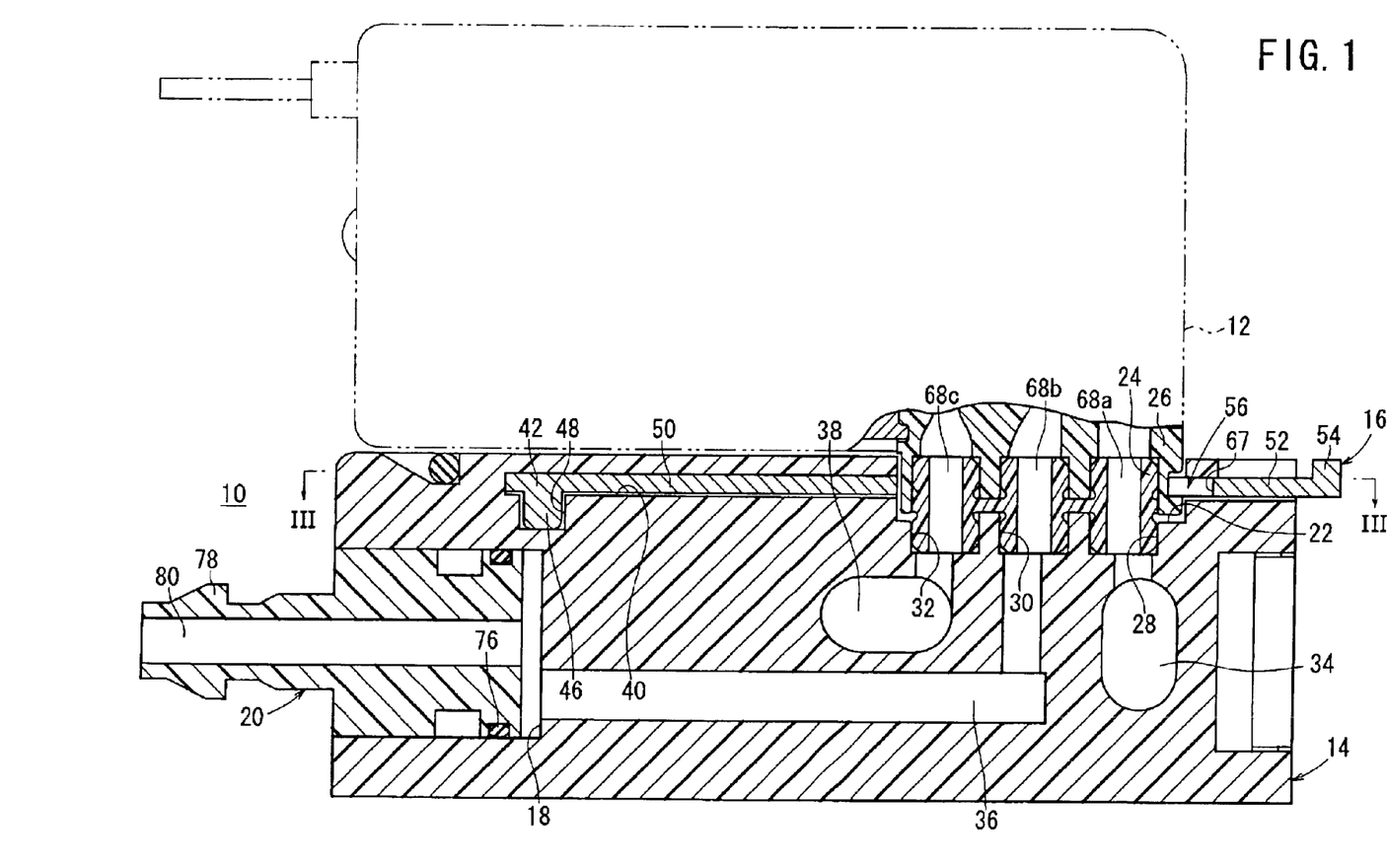
FIG. 1 is a vertical cross-sectional view of a solenoid-operated valve manifold with a solenoid-operated valve unlocked therefrom.
Figure 2:
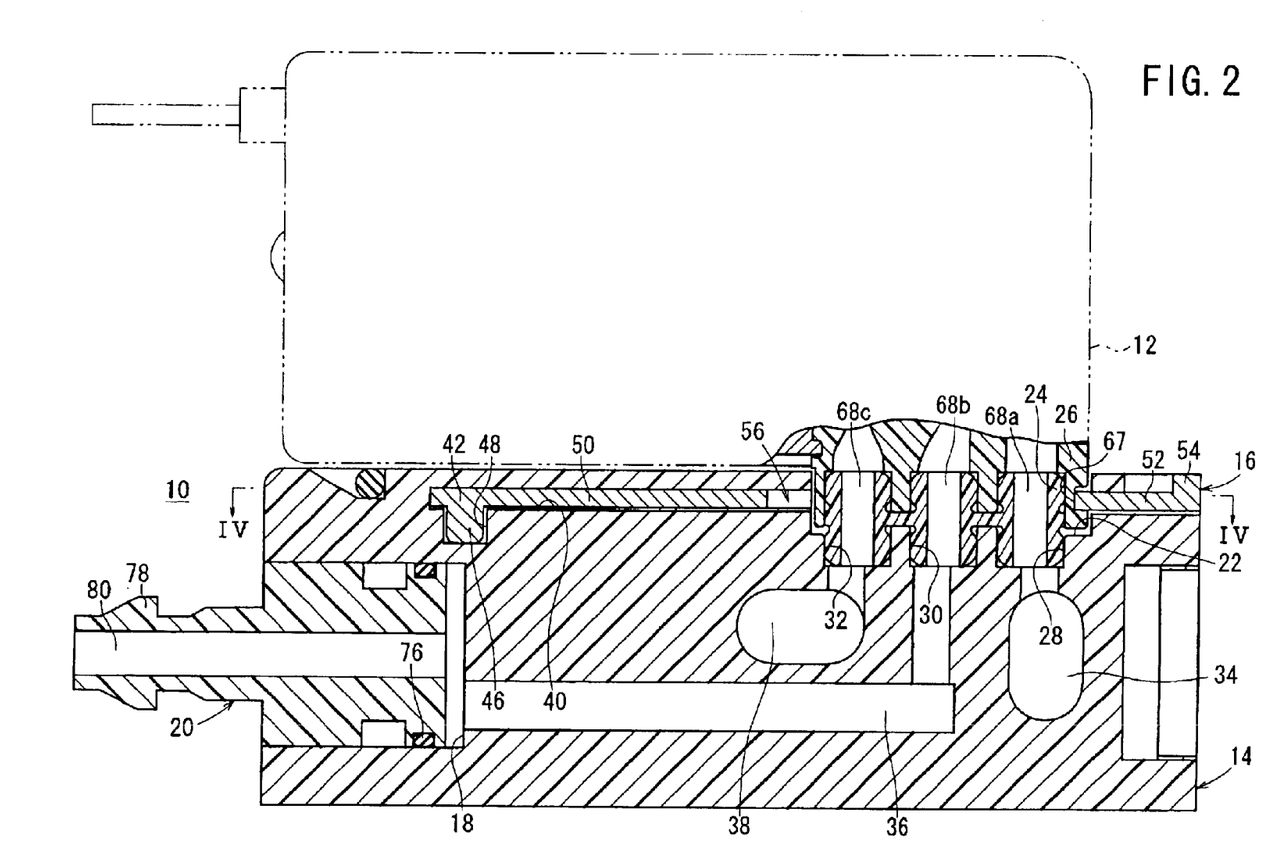
FIG. 2 is a vertical cross-sectional view of the solenoid-operated valve manifold with the solenoid-operated valve locked thereon.

As shown in FIGS. 1 and 2, a solenoid-operated valve manifold 10 according to an embodiment of the present invention comprises a body 14 having an upper surface to which a plurality of ports of a solenoid-operated valve 12 are connected, a stopper member (engaging mechanism) 16 mounted in an upper portion of the body 14, and an insertion plug 20 connected to a connection port 18 defined in a side of the body 14.

The upper surface of the body 14 has an engaging groove (port mount) 22 defined therein which has a predetermined length in the longitudinal direction of the manifold 10. The solenoid-operated valve 12 has a connector (port member) 26 having a plurality of ports defined therein, the connector 26 being inserted in the engaging groove 22 with a gasket 24 of synthetic resin interposed therebetween. The gasket 24 hermetically seals the joint between the ports in the connector 26 of the solenoid-operated valve 12 and first, second, and third ports 28, 30, 32 (described in detail below) defined in the body 14.

The body 14 has a first port 28 defined in the bottom of the engaging groove 22 for supplying a fluid under pressure into the solenoid-operated valve 12, a second port 30 defined in the bottom of the engaging groove 22 for receiving a fluid under pressure discharged from the solenoid-operated valve 12, and a third port 32 defined in the bottom of the engaging groove 22 for venting off a fluid under pressure into the atmosphere. The first, second, and third ports 28, 30, 32 are arranged in a linear array in the longitudinal direction of the body 14.

The body 14 also has defined therein a first passage 34 communicating with the first port 28, a second passage 36 communicating with the second port 30 and the connection port 18 and hence with the insertion plug 20, and a third passage 38 communicating with the third port 32 and the atmosphere.

The body 14 further has a mount hole 40 defined in the upper portion thereof and having a rectangular cross-sectional shape extending from an end face of the body 14 toward the connection port 18. The stopper member 16, which comprises a thin plate made of a springy metal material, is inserted in the mount hole 40.

Figure 3:
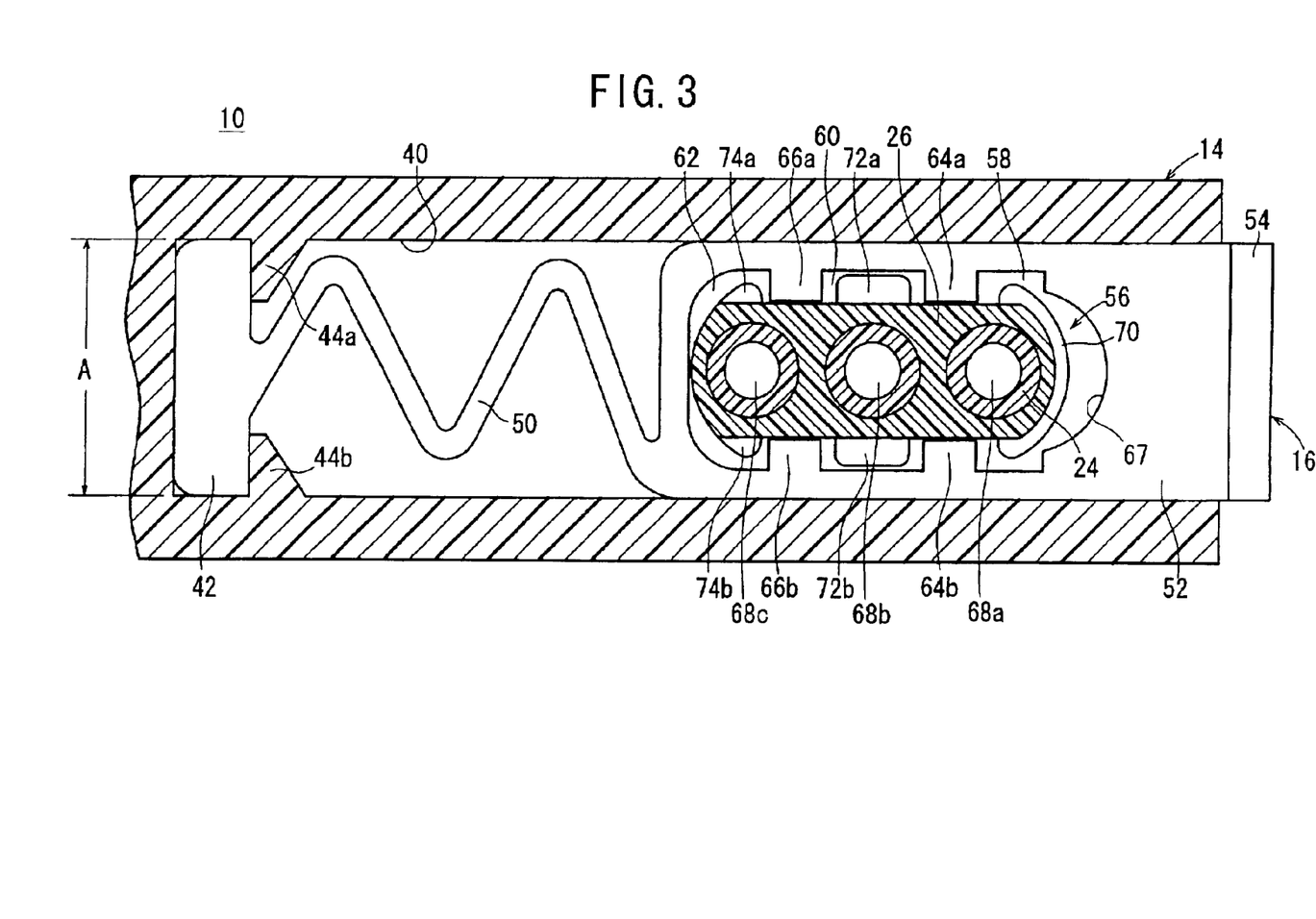
FIG. 3 is a horizontal cross-sectional view taken along line III—III of FIG. 1.
Figure 4:
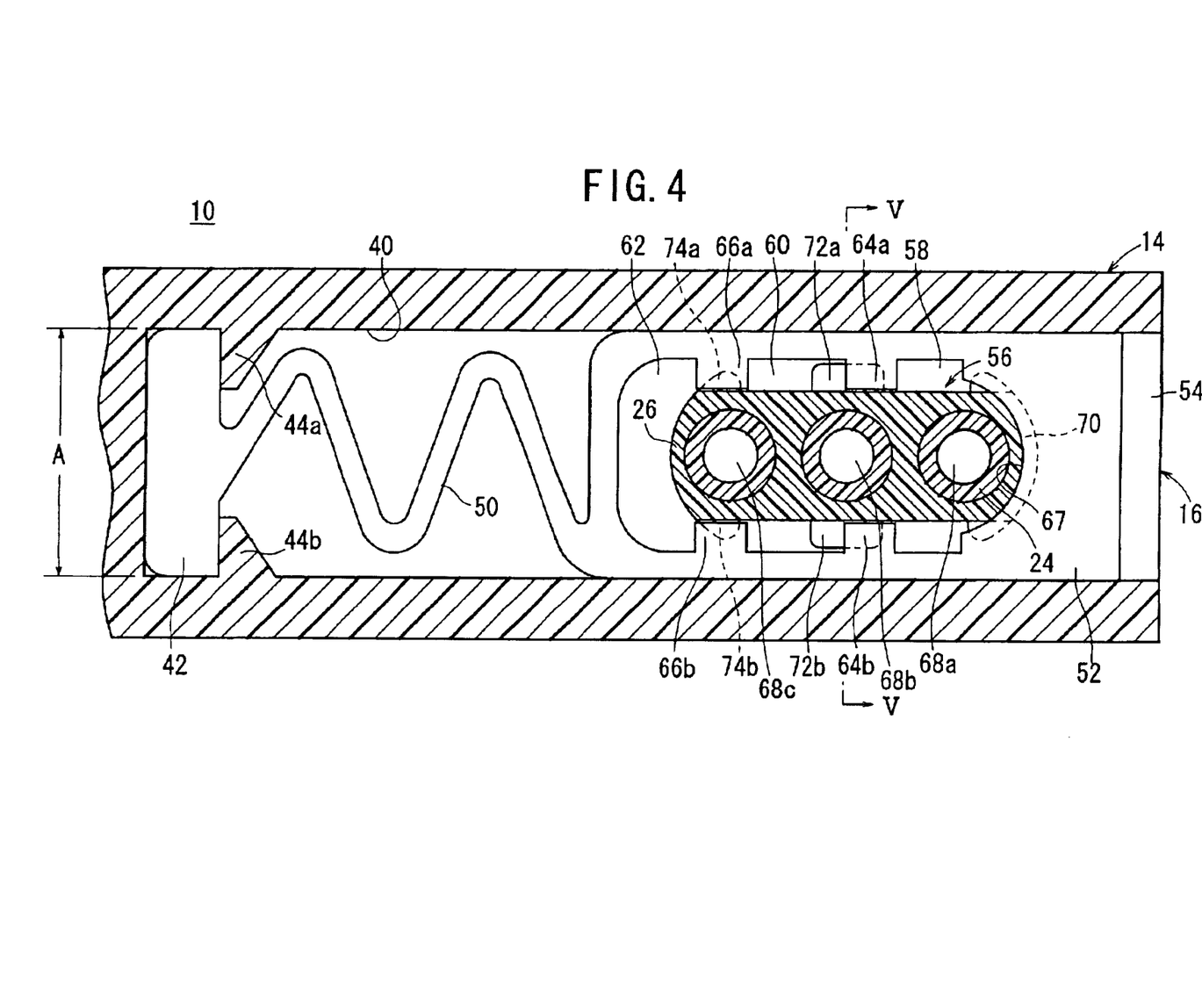
FIG. 4 is a horizontal cross-sectional view taken along line IV—IV of FIG. 2.

As shown in FIGS. 3 and 4, the stopper member 16 has an engaging tongue 42 disposed on one end thereof which has a width that is substantially the same as the width A of the mount hole 40. The engaging tongue 42 is gripped by a pair of locking fingers 44a, 44b projecting a given length from opposite sides of the mount hole 40 and an inner end wall surface of the mount hole 40. The engaging tongue 42 is thus prevented from being displaced in the longitudinal direction of the body 14.

As shown in FIGS. 1 and 2, the stopper member 16 also has a protrusion 46 projecting a certain length from the lower surface of the engaging tongue 42. The protrusion 46 is positioned in alignment with a recess 48 which is defined in the lower surface of the mount hole 40. The protrusion 46 that is inserted in the recess 48 prevents the stopper member 16 from being removed out of the mount hole 40.

Since the engaging tongue 42 is engaged by the inner end wall surface of the mount hole 40 and the locking fingers 44a, 44b and the protrusion 46 engages in the recess 48, the stopper member 16 is firmly locked in place against removal from the mount hole 40.

The stopper member 16 also has a tortuous spring arm 50 extending from a substantially central portion of the engaging tongue 42. Since the spring arm 50 which is part of the stopper member 16 is thin, it is effective to reduce the height of the body 14.

In FIGS. 1 and 2, a cross-section of the spring arm 50 is shown continuously and linearly for illustrative purpose, though the spring arm 50 has a tortuous shape when viewed from above (see also FIGS. 3 and 4).

The stopper member 16 also has a substantially elongate rectangular plate 52 which is integrally connected to the spring arm 50 remotely from the engaging tongue 42, as shown in FIGS. 3 and 4. The spring arm 50 normally urges the plate 52 to move away from the engaging tongue 42.

The plate 52 has a presser 54 bent upwardly and extending a certain length from the end of the plate 52 remote from the spring arm 50 (see also FIGS. 1 and 2). The presser 54 is to be pushed by an external force for connecting and disconnecting the solenoid-operated valve 12. The plate 52 also has an engaging hole 56 defined therein for receiving the connector 26 of the solenoid-operated valve 12 therein and engaging the connector 26 when the plate 52 is displaced.

As shown in FIGS. 3 and 4, the engaging hole 56 includes a first hole 58, a second hole 60, and a third hole 62 successively positioned in the order named from the presser 54. The plate 52 includes a pair of first projecting teeth (first projections) 64a, 64b disposed between the first and second holes 58, 60 and projecting a given length toward the inserted connector 26 and facing each other perpendicularly to the longitudinal axis of the stopper member 16, and a pair of second projecting teeth (first projections) 66a, 66b disposed between the second and third holes 60, 62 and projecting a given length toward the inserted connector 26 and facing each other perpendicularly to the longitudinal axis of the stopper member 16. The first hole 58 is partly defined by a substantially semicircular edge 67 close to the presser 54.

As shown in FIGS. 3 and 4, the connector 26 of the solenoid-operated valve 12 which is inserted in the engaging hole 56 has three fluid passages 68a, 68b, 68c defined therein for communication with an internal space in the solenoid-operated valve 12. The gasket 24 is inserted in the fluid passages 68a, 68b, 68c. When the solenoid-operated valve 12 is connected to the manifold 10, the fluid passages 68a, 68b, 68c are held in communication with the first, second, and third ports 28, 30, 32, respectively, in the body 14. The fluid passages 68a, 68b, 68c are arrayed linearly along the longitudinal axis of the connector 26 which is substantially parallel to the longitudinal direction of the body 14. The connector 26 has opposite ends which are of a substantially arcuate cross-sectional shape.

The connector 26 has a first flange (second projection) 70 of a substantially semicircular cross-sectional shape disposed on an end thereof which is inserted in the first hole 58 and projecting a given length radially outwardly. A pair of second flanges (second projection) 72a, 72b of a substantially rectangular shape disposed on central sides of the connector 26 are inserted in the second hole 60 and project a given length away from the fluid passage 68b (see FIG. 6).

Figure 6:
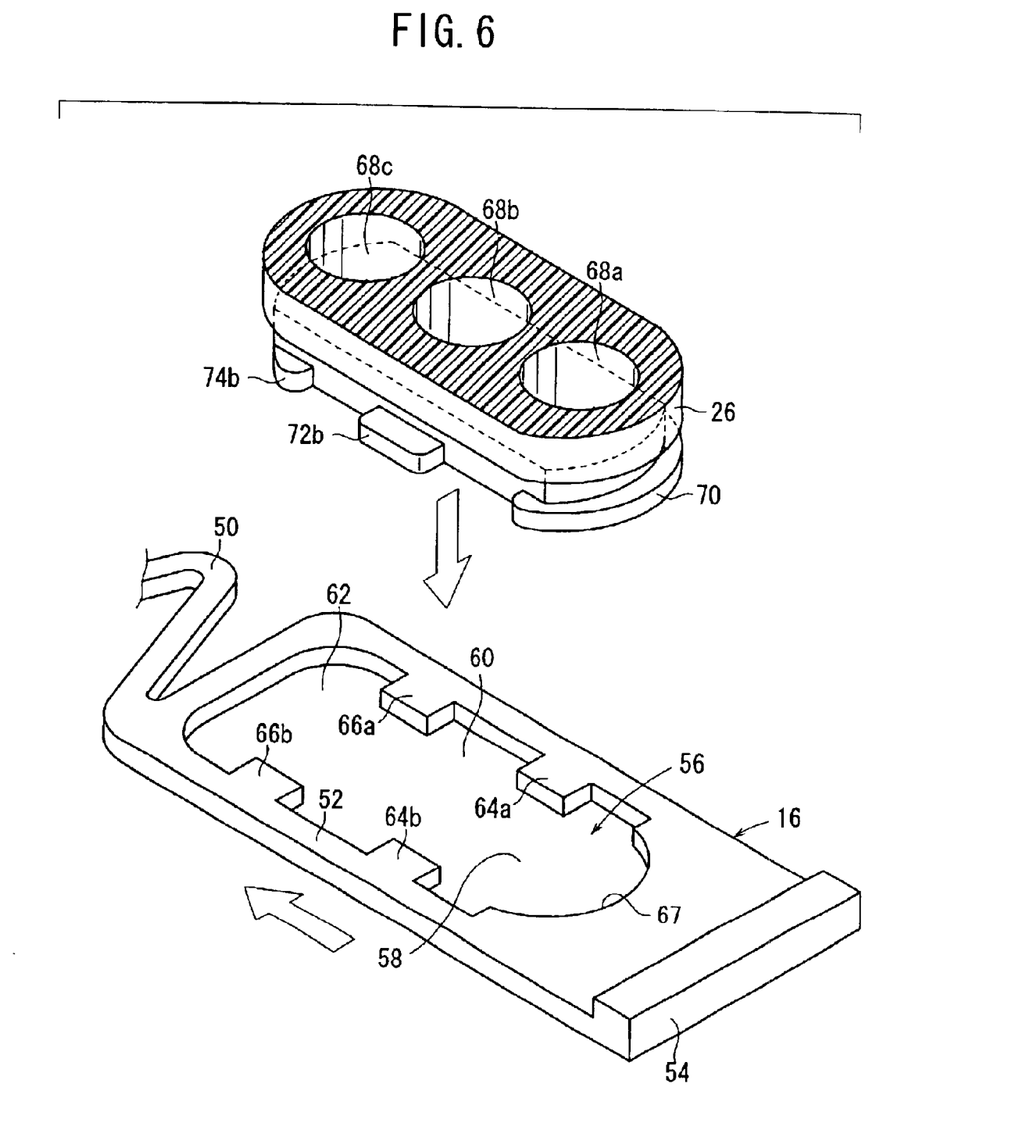
FIG. 6 is an exploded perspective view, partly cut away, showing a stop member of the solenoid-operated valve manifold which is to be coupled to a connector of the solenoid-operated valve.

The connector 26 also has a pair of third flanges (second projection) 74a, 74b of an arcuate cross-sectional shape disposed on the other end thereof which is inserted in the third hole 62 and projecting a given length away from the fluid passage 68c.

Figure 5:
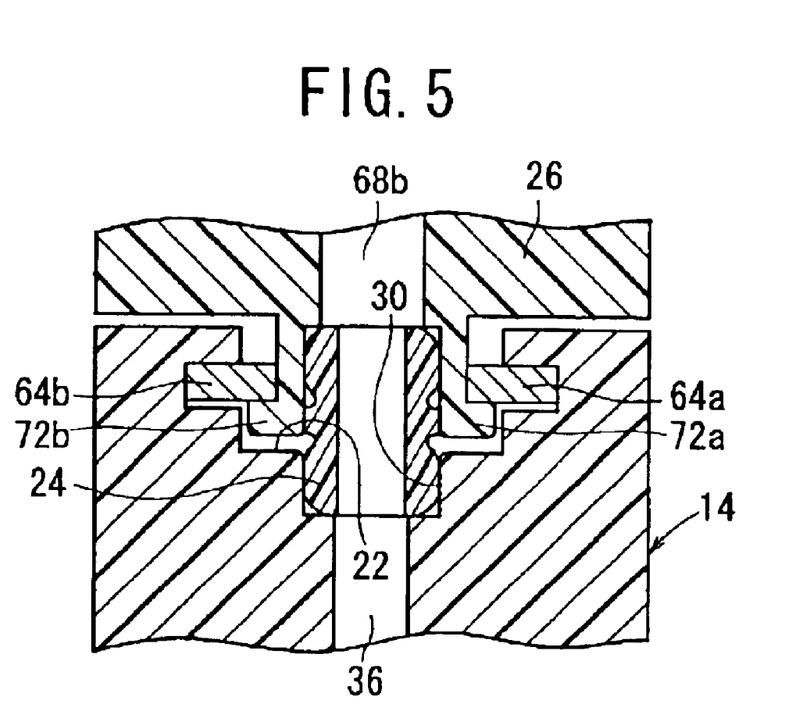
FIG. 5 is a fragmentary vertical cross-sectional view taken along line V—V of FIG. 4.

As shown in FIG. 5, the second flanges 72a, 72b are disposed on a lower portion of the connector 26, and have respective upper surfaces disposed beneath the lower surface of the stopper member 16 when the solenoid-operated valve 12 is connected to the manifold 10. Similarly, the first and third flanges 70, 74a, 74b are disposed on a lower portion of the connector 26, and have respective upper surfaces disposed beneath the lower surface of the stopper member 16 when the solenoid-operated valve 12 is connected to the manifold 10.

When the first projecting teeth 64a, 64b are engaged by the upper surfaces of the second flanges 72a, 72b, the stopper member 16 is guided substantially horizontally along the mount hole 40. Similarly, when the end 67 of the first hole 58 and the second projecting teeth 66a, 66b are engaged by the upper surfaces of the first and third flanges 70, 74a, 74b, the stopper member 16 is also guided substantially horizontally along the mount hole 40.

As shown in FIGS. 1 and 2, the insertion plug 20 has an end inserted in the connection port 18 and hermetically sealed by a seal ring 76 mounted in an annular groove defined in the outer circumferential surface of the insertion plug 20. The insertion plug 20 has an insertion end 78 remote from the end inserted in the connection port 18 and smaller in diameter than the end inserted in the connection port 18. A tube (not shown) is connected to the insertion end 78.

The insertion plug 20 also has a communication passage 80 defined therein and extending axially therethrough. A fluid discharged from the second port 30 is discharged through the second passage 36 and the communication passage 80 out of the manifold 10.

The manifold 10 according to the embodiment of the present invention is basically constructed as described above. Operation and advantages of the manifold 10 will be described below.

The connector 26 of the solenoid-operated valve 12 is inserted into the engaging groove 22 in the body 14, as shown in FIG. 6, and the solenoid-operated valve 12 is to be connected to the manifold 10 by the stopper member 16, as shown in FIG. 1.

At this time, as shown in FIG. 3, since the stopper 16 is urged away from the engaging tongue 42 under the bias of the spring arm 50, the presser 54 of the plate 52 projects a certain length out of the end face of the body 14 (see FIG. 1).

The first flange 70 is placed in the first hole 58, the second flanges 72a, 72b in the second hole 60, and the third flanges 74a, 74b in the third hole 62. The end 67 of the first hole 58 and the first and second projecting teeth 64a, 64b, 66a, 66b of the plate 52 do not overlap the first, second, and third flanges 70, 72a, 72b, 74a, 74b along the axes of the fluid passages 68a, 68b, 68c in the solenoid-operated valve 12 (see FIG. 3).

Therefore, the solenoid-operated valve 12 can freely be removed from and inserted into the engaging groove 22 in the manifold 10 along the axes of the fluid passages 68a, 68b, 68c.

Then, the presser 54 is pushed toward the engaging tongue 42 by an external force against the bias of the spring arm 50 until the outer end face of the presser 54 is substantially aligned with the end face of the body 14 (see FIG. 2). When the presser 54 is then held in the pushed position by a lock mechanism (not shown), the first and second projecting teeth 64a, 64b, 66a, 66b remain displaced in unison with the plate 52, as shown in FIG. 4.

The end 67 of the first hole 58 engages the first flange 70, the first projecting teeth 64a, 64b engage the second flanges 72a, 72b, and the second projecting teeth 66a, 66b engage the third flanges 74a, 74b.

As the plate 52 is displaced, the end 67 of the first hole 58 is displaced substantially horizontally onto the upper surface of the first flange 70, the first projecting teeth 64a, 64b are displaced substantially horizontally onto the upper surfaces of the second flanges 72a, 72b, and the second projecting teeth 66a, 66b are displaced substantially horizontally onto the upper surfaces of the third flanges 74a, 74b.

Figure 7:
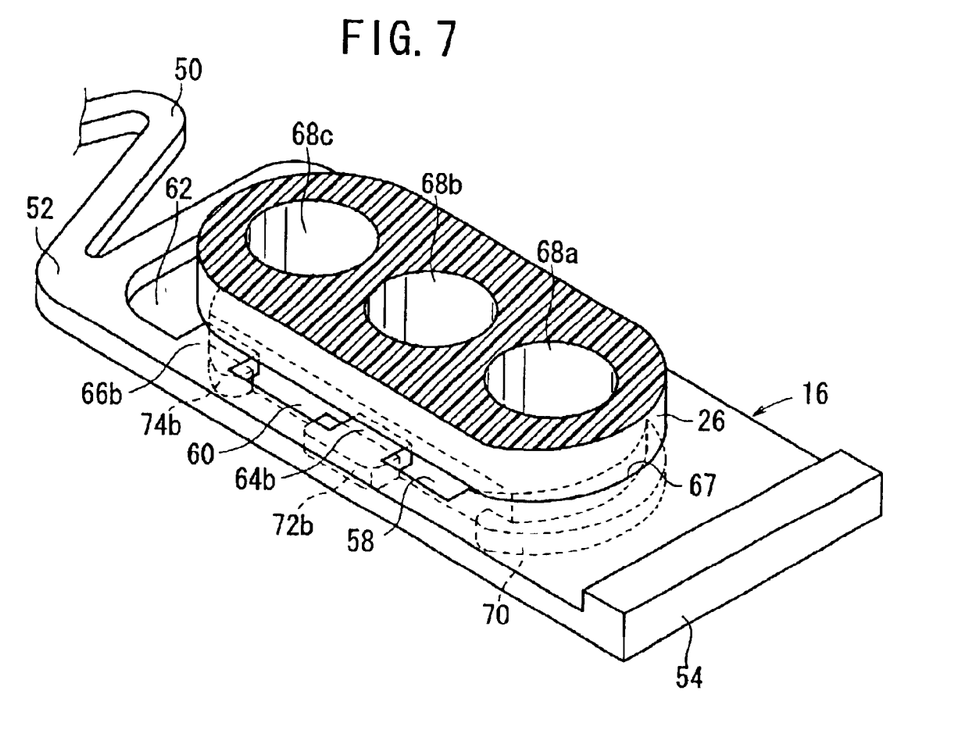
FIG. 7 is a perspective view, partly cut away, showing the stop member which is coupled to the connector.

As a result, as shown in FIGS. 4 and 7, the end 67 of the first hole 58, the first projecting teeth 64a, 64b, and the second projecting teeth 66a, 66b overlap the first flange 70, the second flanges 72a, 72b, and the third flanges 74a, 74b, respectively, across the axes of the fluid passages 68a, 68b, 68c.

The engagement of the end 67 of the first hole 58, the first projecting teeth 64a, 64b, and the second projecting teeth 66a, 66b with the first, second, and third flanges 70, 72a, 72b, 74a, 74b prevents the solenoid-operated valve 12 from being displaced along the axes of the fluid passages 68a, 68b, 68c. Thus, the solenoid-operated valve 12 is coupled to the manifold 10.

In the illustrated embodiment, when the solenoid-operated valve 12 is mounted on the manifold 10, the stopper member 16 remains pushed in by the non-illustrated lock mechanism against the bias of the spring arm 50.

However, the manifold 10 may incorporate a spring (not shown) for biasing the plate 52 toward the engaging tongue 42. When the solenoid-operated valve 12 is mounted on the manifold 10, the solenoid-operated valve 12 may remain locked on the manifold 10 under the bias of the spring, and when the solenoid-operated valve 12 is detached from the manifold 10, the plate 52 may be retained in a position away from the engaging tongue 42 by a non-illustrated lock mechanism.

According the embodiment of the present invention, the stopper member 16 mounted in the body 14 is displaced to bring the end 67 of the first hole 58 and the first and second projecting teeth 64a, 64b, 66a, 66b into engagement with the first, second, and third flanges 70, 72a, 72b, 74a, 74b across the axes of the fluid passages 68a, 68b, 68c. As a result, the solenoid-operated valve 12 is prevented from being displaced along the axes of the fluid passages 68a, 68b, 68c. Therefore, the solenoid-operated valve 12 and the manifold 10 can easily be connected to each other without any mounting screws or the like.

When the non-illustrated lock mechanism is released, the stopper member 16 is unlocked under the bias of the spring arm 50, i.e., the end 67 of the first hole 58 and the first and second projecting teeth 64a, 64b, 66a, 66b of the plate 52 are disengaged from the first, second, and third flanges 70, 72a, 72b, 74a, 74b under the bias of the spring arm 50. As a consequence, the solenoid-operated valve 12 can be displaced along the axes of the fluid passages 68a, 68b, 68c, allowing the solenoid-operated valve 12 to be easily removed from the manifold 10.

Since the solenoid-operated valve 12 can be installed on and removed from the manifold 10 by the displacement of the stopper member 16, no mounting screws are required to connect the solenoid-operated valve 12 to the manifold 10. Accordingly, the number of parts required is reduced, and no tedious and time-consuming process is needed to install and remove the solenoid-operated valve 12 on and from the manifold 10.

Furthermore, because the spring arm 50 integral with the stopper member 16 is thin, the height of the body 14 may be smaller than if other springs such as a helical spring were used to urge the stopper member 16. Therefore, the size of the manifold 10 may be smaller than heretofore.

Although a certain preferred embodiment of the present invention has been shown and described in detail, it should be understood that various changes and modifications may be made therein without departing from the scope of the appended claims.

What is claimed is:

1. A manifold connected to a solenoid-operated valve, comprising:
    a body having fluid passages defined therein;
    a port mount for receiving a port member for supplying and discharging a fluid under pressure to and from the solenoid-operated valve, said port mount being defined in a connection surface of said body to which said solenoid-operated valve is connected; and
    an engaging mechanism mounted on said body and disposed for displacement substantially parallel to said connection surface of said body;
    wherein when said engaging mechanism is displaced into engagement with said port member, said solenoid-operated valve is locked on said body through said port member.

2. A manifold according to claim 1, wherein said engaging mechanism comprises a stopper member disposed for displacement in a longitudinal direction of said body, said stopper member comprising:

a presser disposed on an end of said stopper member and exposed out of said body;

an engaging hole for receiving said port member inserted therein; and a first projection disposed on an inner wall surface of said engaging hole and projecting toward said port member;

wherein when said presser is pressed to displace said stopper member, said first projection engages a second projection projecting from said port member.

3. A manifold according to claim 2, wherein said stopper member has a thin spring arm for urging the stopper member to be displaced.

4. A manifold according to claim 2, wherein said stopper member comprises a plate having a thin spring arm, said stopper member being mounted for displacement along a mount hole defined in said body closely to and substantially parallel to said connection surface of the body.

5. A manifold according to claim 3, wherein said spring arm has a tortuous shape.

6. A manifold according to claim 4, wherein said spring arm has a tortuous shape.

7. A manifold according to claim 1, wherein said port member comprises a connector of the solenoid-operated valve, said connector having fluid passages defined therein with a gasket mounted therein.

8. A manifold according to claim 2, wherein said stopper member has an engaging tongue engaged by a pair of locking fingers disposed in a mount hole defined in said body.

9. A manifold according to claim 2, wherein said engaging hole includes first, second, and third holes, said first projection including a pair of first projecting teeth disposed between the first and second holes and a pair of second projecting teeth disposed between said second and third holes, said first projecting teeth and said second projecting teeth having a rectangular cross-sectional shape and facing each other substantially perpendicularly to the axis of said stopper member.

10. A manifold according to claim 2, wherein said second projection comprises a first flange disposed on an outer circumferential surface of said port member and having a substantially semicircular cross-sectional shape, a pair of second flanges disposed on the outer circumferential surface of said port member and having a substantially rectangular cross-sectional shape, and a pair of third flanges disposed on the outer circumferential surface of said port member and having a substantially arcuate cross-sectional shape.

* * * * *